United States Patent [19]
Lee et al.

[11] Patent Number: 5,878,367
[45] Date of Patent: Mar. 2, 1999

[54] PASSIVE ACOUSTIC TRAFFIC MONITORING SYSTEM

[75] Inventors: Gregory Reid Lee, Torrance; Yie-Ming Chen, Rancho Palos Verdes, both of Calif.

[73] Assignee: Northrop Grumman Corporation, Los Angeles, Calif.

[21] Appl. No.: 671,992

[22] Filed: Jun. 28, 1996

[51] Int. Cl.⁶ .............. H04B 11/00; G08G 1/01; G08G 1/04

[52] U.S. Cl. .............. 701/117; 701/118; 701/119; 367/135; 340/943

[58] Field of Search .............. 701/117, 118, 701/119; 340/934, 935, 943; 180/167, 169; 73/645, 646; 367/135

[56] References Cited

U.S. PATENT DOCUMENTS

| | | | |
|---|---|---|---|
| 2,015,612 | 9/1935 | Adler, Jr. | 177/337 |
| 2,419,099 | 4/1947 | Wall | 234/29.5 |
| 2,713,679 | 7/1955 | Ewertz | 340/263 |
| 2,837,914 | 6/1958 | Caldwell | 73/67.1 |
| 3,199,074 | 8/1965 | Hales et al. | 340/38 |
| 3,253,744 | 5/1966 | Auer, Jr. | 340/37 |
| 3,445,637 | 5/1969 | Auer, Jr. | 235/150.2 |
| 3,506,809 | 4/1970 | Pallat | 235/150.24 |
| 3,573,724 | 4/1971 | Komorida | 340/38 |
| 3,824,842 | 7/1974 | Wirt et al. | 73/69 |
| 3,960,004 | 6/1976 | Wirt et al. | 73/67.1 |
| 4,235,303 | 11/1980 | Dhoore et al. | 181/214 |
| 4,305,295 | 12/1981 | Anderson et al. | 73/589 |
| 4,370,718 | 1/1983 | Chasek | 364/436 |
| 4,379,191 | 4/1983 | Beggs et al. | 428/118 |
| 4,397,187 | 8/1983 | Stribling | 73/589 |
| 4,463,453 | 7/1984 | Cohen et al. | 367/135 |
| 4,651,566 | 3/1987 | Andersson et al. | 73/589 |
| 4,674,069 | 6/1987 | Mizuno | 367/90 |
| 4,768,379 | 9/1988 | Arcas et al. | 73/589 |
| 5,172,597 | 12/1992 | Hedeen | 73/646 |
| 5,377,546 | 1/1995 | Arcas et al. | 73/589 |
| 5,619,616 | 4/1997 | Brady et al. | 395/22 |

*Primary Examiner*—Michael Zanelli
*Attorney, Agent, or Firm*—Terry J. Anderson; Karl J. Hoch, Jr.

[57] ABSTRACT

Traffic is monitored in individual lanes of a roadway as to vehicle count or presence, speed and direction of movement by mounting a microphone array high above the road surface, digitizing the output signals of the microphones, filtering, beamforming and storing the digitized signals to provide separate power histories for separate locations in individual lanes. These power histories are then analyzed to provide vehicle movement data for each lane.

11 Claims, 6 Drawing Sheets

PASSIVE ACOUSTIC TRAFFIC MONITORING SYSTEM

FIELD OF INVENTION

This invention concerns traffic monitoring systems, and more particularly a passive digital system using a single beam-steered microphone array to simultaneously monitor the presence, speed and direction of separate vehicles in multiple lanes.

BACKGROUND OF THE INVENTION

The increasing congestion of city streets from rapid growth of automative traffic has created a need for more and more sophisticated demand-responsive traffic control systems. Typically, cities have filled this need by tying traffic lights on major thoroughfares into a control center in which computer-assisted technicians can observe traffic through strategically placed remote-controlled video cameras and/or traffic counters, and then adjust traffic light cycles to move the maximum number of vehicles with the least delays.

Increased automation of this process requires that the control center be supplied with precise, real-time computer-readable data regarding the movement of vehicles in a plurality of lanes and directions. To some degree, this can be accomplished by systems using inductive loop sensors in the pavement, but such systems are limited in their sensing ability and area coverage, are expensive and are subject to mechanical damage.

A need therefore exists for a simple, relatively inexpensive monitoring system that can be quickly installed in an out-of-the-way place adjacent a roadway; which does not require the sawing of wire-carrying grooves into the roadway, thereby reducing installation cost and premature wearing of the road surface; and which provides simultaneous digitized real-time information on the position, speed and direction of all vehicles in the area of interest in and around the intersection.

SUMMARY OF THE INVENTION

The invention fills the above-described need by providing a passive array of two or more closely spaced microphones which can be mounted on a street light pole or other available pole at or near the road curb, and which are beam-steered to continuously monitor a wide predetermined field of view of the presence and location of sounds rich in certain audio frequencies which distinguish the sound of a vehicle from background noise. By tracking the incremental change in location of each detected vehicle at frequent intervals and analyzing the quality of the sound made as a vehicle passes by the microphone array, the system can compute each vehicle's speed and direction of movement. The resulting traffic information can be transmitted in real time to a control central, where it can be used as desired.

DESCRIPTION OF THE PREFERRED EMBODIMENTS

Figure 1:
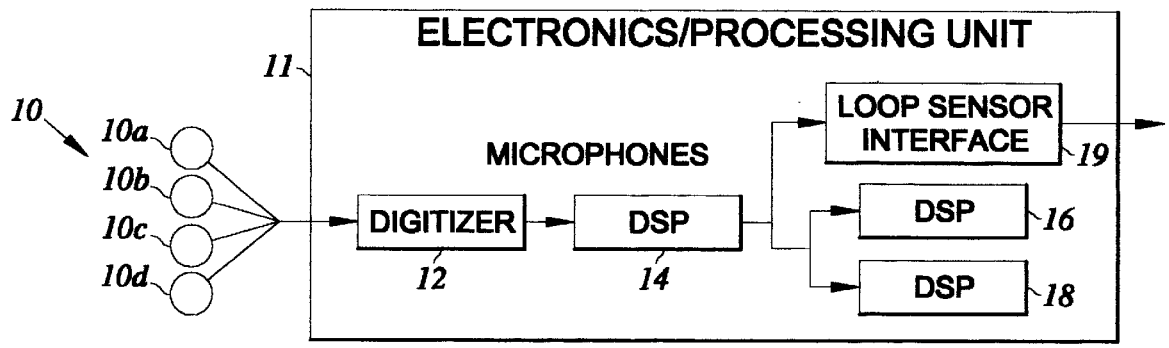
FIG. 1 is a block diagram of the hardware used in the invention.

FIG. 1 shows in block form the general hardware configuration of the system of this invention. Sound picked up by an array of 10 microphones 10a through 10d is applied to an electronics unit 11 containing a digitizer 12 which converts the analog outputs of the microphones 10a–10d into digital form. The resulting digital data is applied to a digital signal processor (DSP) 14, which is essentially a conventional high-speed computer optimized for data manipulation of this kind. The DSP 14 performs the filtering, beamforming, and analysis functions of the system which are described in more detail below. The computed traffic information may, for testing or other purposes, be displayed on a computer monitor 16 or recorded on a computer disk 18. For ordinary operation, the computer monitor 16 and computer disk 18 would not necessarily be present. A loop sensor interface 19 may be used to convert the computed traffic information into the format used by conventional inductive loop sensors to operate a conventional loop controller or transmit traffic information to a central traffic management facility.

Figure 2A:
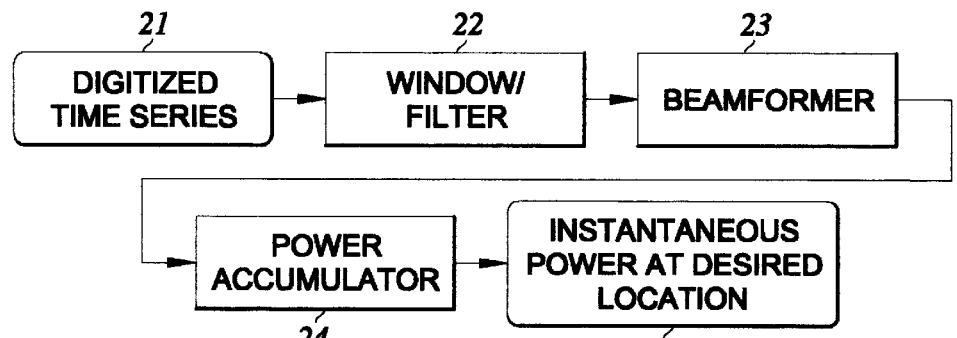
FIGS. 2a and 2b are block diagrams of the software used in the invention.
Figure 2C:
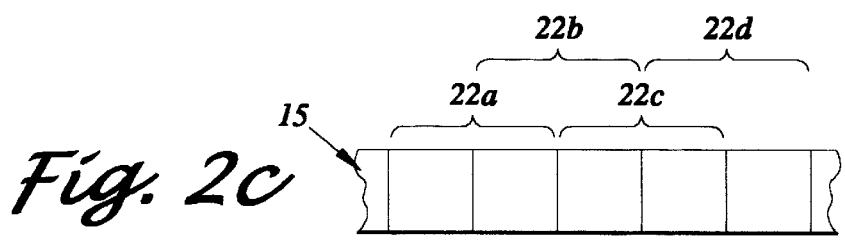
FIG. 2c illustrates the data segment sequence of the digital signal processor.
Figure 3A:
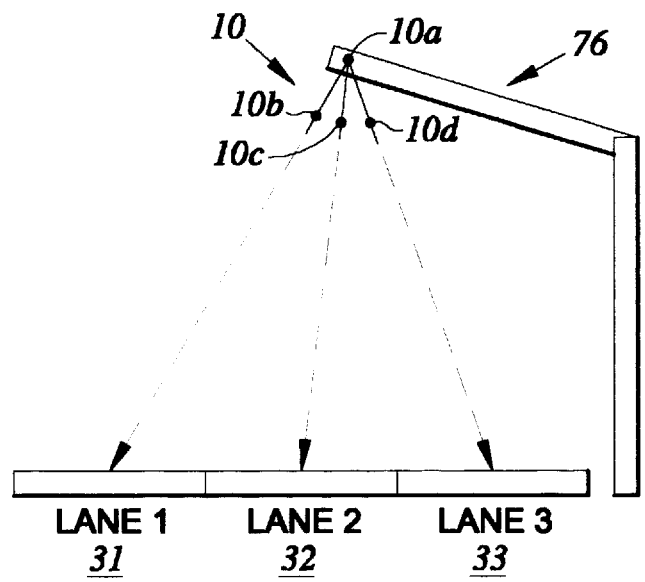
FIGS. 3a and 3b are elevational and plan views, respectively, or a roadway illustrating the use of the invention thereon.
Figure 3B:
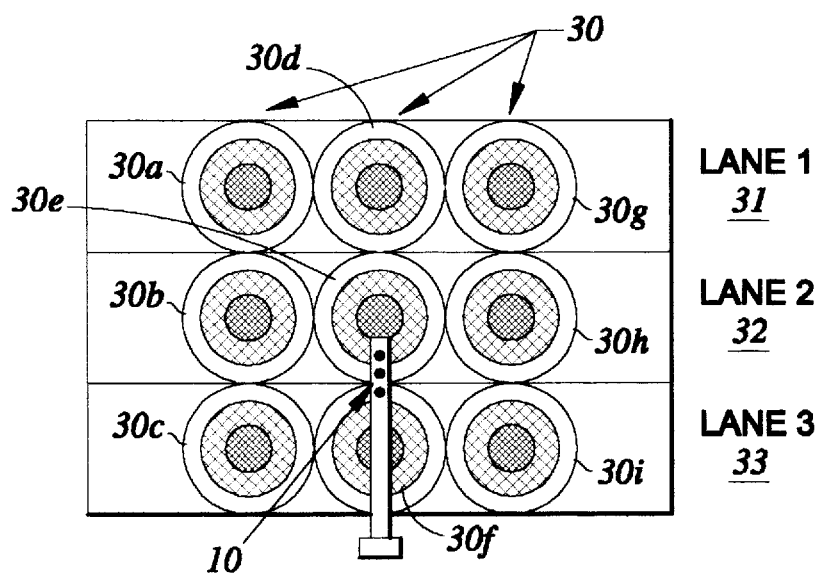

The DSP 14 performs the signal processing on the microphone outputs as shown in FIG. 2a. The DSP 14 receives the digitized time series 15 from the digitizer 12 at 21 and divides the incoming data into a sequence of windows or segments of data 22a through 22d (FIG. 2c) at 22. Filtering is also performed at 22 to restrict the bandwidth of the microphone data to that bandwidth where the sound made by vehicles predominates. Beamforming 23 is applied by conventional techniques to the filtered data from 22 to selectively enhance or mask sounds based on their location relative to the microphone array 10. Specifically, a small number of predetermined locations in each of the traffic lanes 31, 32, 33 (FIGS. 3a and 3b) are selected to be used in the analysis of traffic flow. As shown in FIG. 3b, these locations 30a–30i would typically be chosen to be underneath the microphone array 10 or a small distance (on the order of a car length) away. Separate beamforming operations are made on the data from 22 to determine the sound power emanating from each of these predetermined locations. A power accumulator 24 then sums the power for each output of the beamformer 23 over the pass-band bandwidth of the filter 22. The result 25 is a measure of the instantaneous sound power at each of the predetermined locations 30a–30i.

Figure 2B:
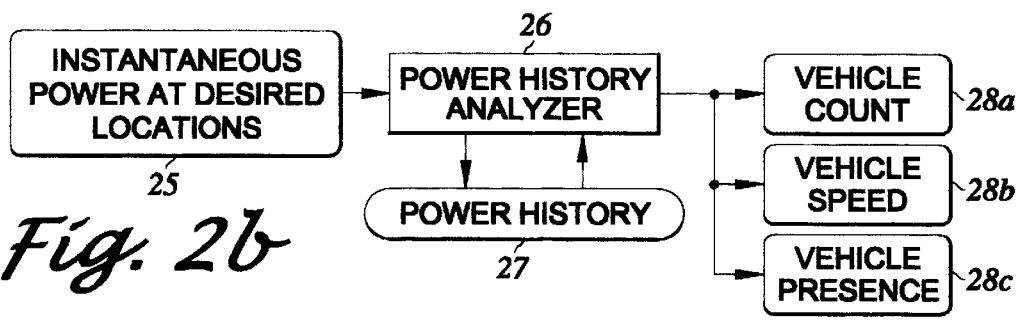

As shown in FIG. 2b, the instantaneous power readings are saved to form separate power histories or records 27 (FIG. 6) of the power from each of the predetermined locations 30a–30i over time. A conventional analyzer 26 then analyzes the power history 27 as described below for each of the predetermined locations 30a–30i to determine when a vehicle has passed by the microphone array 10 and in which lane (result 28a), to determine the speed and direction of the vehicle (result 29b), and to determine when a stationary vehicle is present in the vicinity of the microphone array 10 (result 28c).

Figure 4:
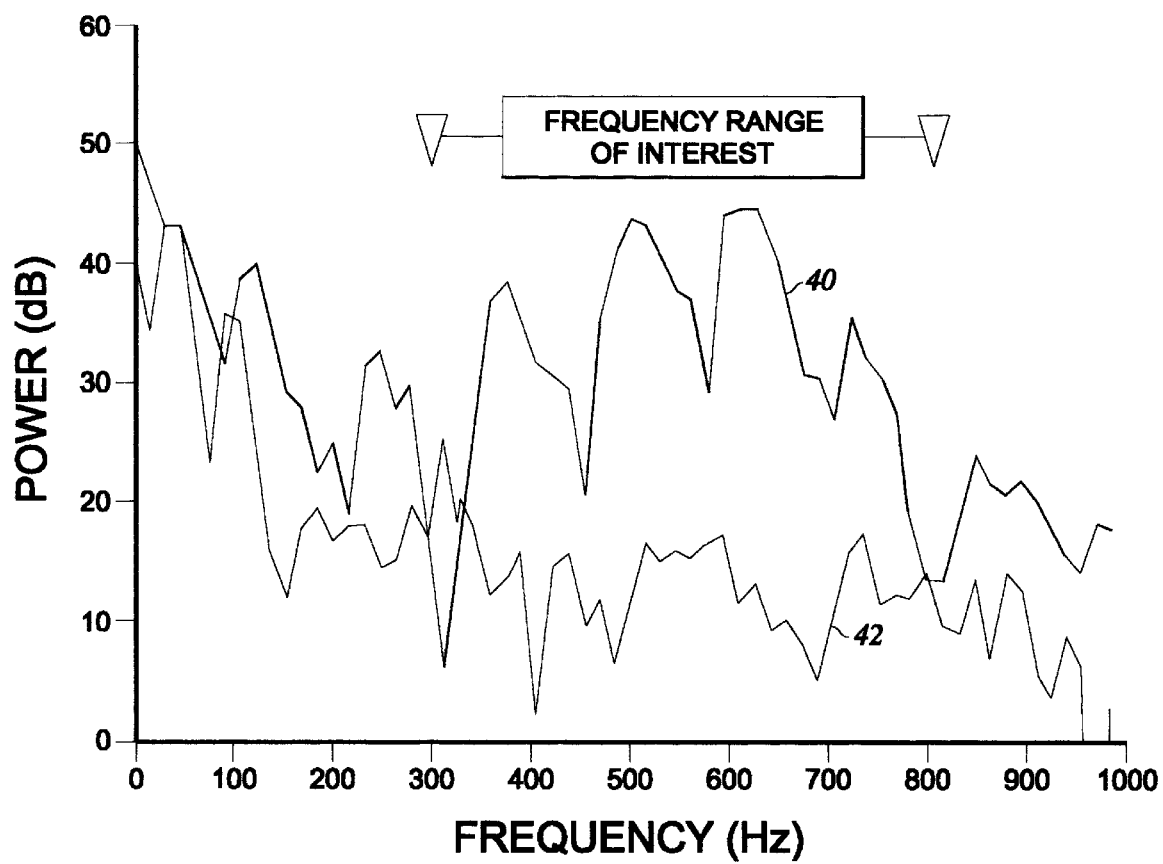
FIG. 4 is a frequency-power diagram showing the frequency spectra associated with the presence and absence of a vehicle on the roadway.

The bandwidth of interest for sound produced by vehicles is generally under 1000 Hz, preferably in one or more frequency bands in the approximate range of 300–800 Hz, as shown in FIG. 4. In that figure, curve 40 illustrates the frequency spectrum of a vehicle sound, while curve 42 illustrates the frequency spectrum of background noise. However, regardless of the actual choice of bandwidth or other parameters detailed herein, the system of this invention will operate in exactly the same way as described herein. The digitizer 12 operates at a rate sufficient to capture the desired bandwidth with adequate resolution to faithfully represent the sound in digital form. The DSP 14 has sufficient processing speed and memory to perform the required operations on the incoming data as it is captured; that is, it operates in real time.

Figure 5A:
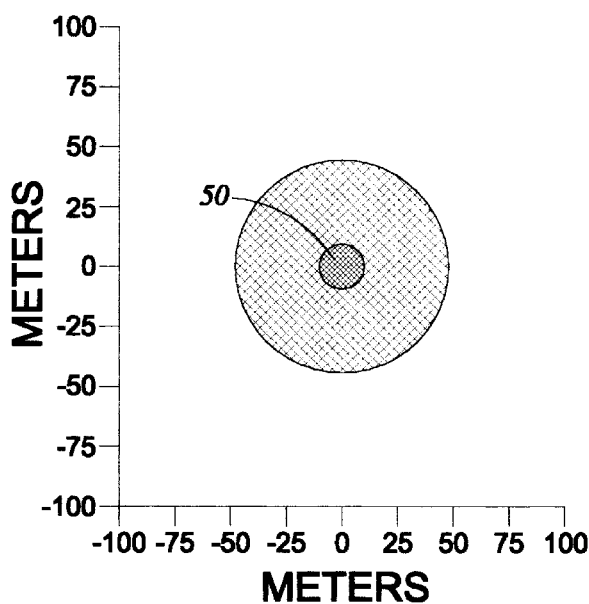
FIGS. 5a and 5b illustrate the beam pattern of the invention at ground level.
Figure 5B:
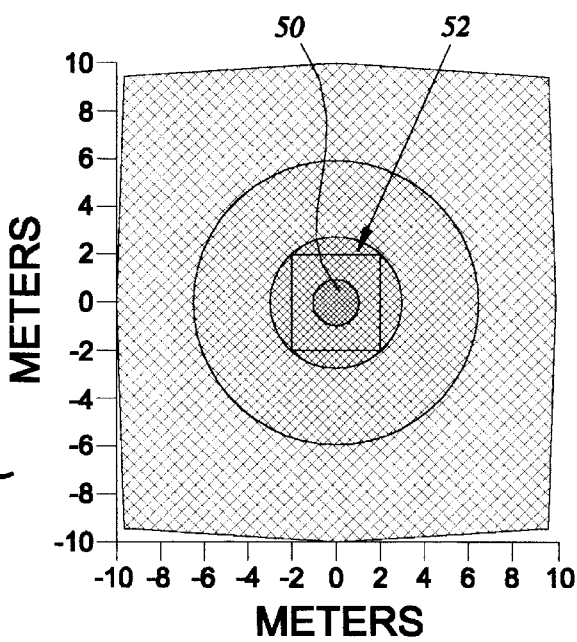
Figure 5C:
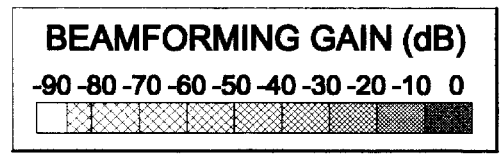
FIG. 5c is the legend explaining the shading of FIGS. 5a and 5b.

The incoming data 21 is segmented into short segments or windows of approximately 60 milliseconds in length. These segments may be overlapped in time to insure that no incoming data is missed. Each segment of data is first filtered at 22 to limit its bandwidth as described above. This filtering is done on the output of each of the microphones 10a through 10d. The beamforming procedure 23 then applies a different, unique time delay to each microphone's output and then combines these outputs. A separate beamforming procedure is performed for each of the different predetermined locations 30a–30i as described above. A ground projection for a typical beam pattern is shown in FIGS. 5a and 5b. As seen in FIG. 5b, if the sound power received by a microphone array 10 with 0.6 m separation mounted about 10 meters above a roadway from the axis 50 of the beam pattern at ground level is taken as 0 db, the sound power is down to approximately –50 db outside a 4×4 m area 52 centered on the axis 50 of the beam pattern. This is roughly the width of a lane and the length of a car. FIG. 5a shows that the sound power drops below –90 db in less than a 50 m radius from the beam axis 50. The power in each of the beamformer outputs is accumulated at 24 over the filter pass-band frequency range. Thus, result 25 represents the sound power at each of the predetermined locations in the traffic lanes during the approximately 60 millisecond duration of the window 22a. This process is continuously repeated for windows 22b through 22d approximately every 30 milliseconds to compute a new measure of power for each of the predetermined locations.

Figure 6:
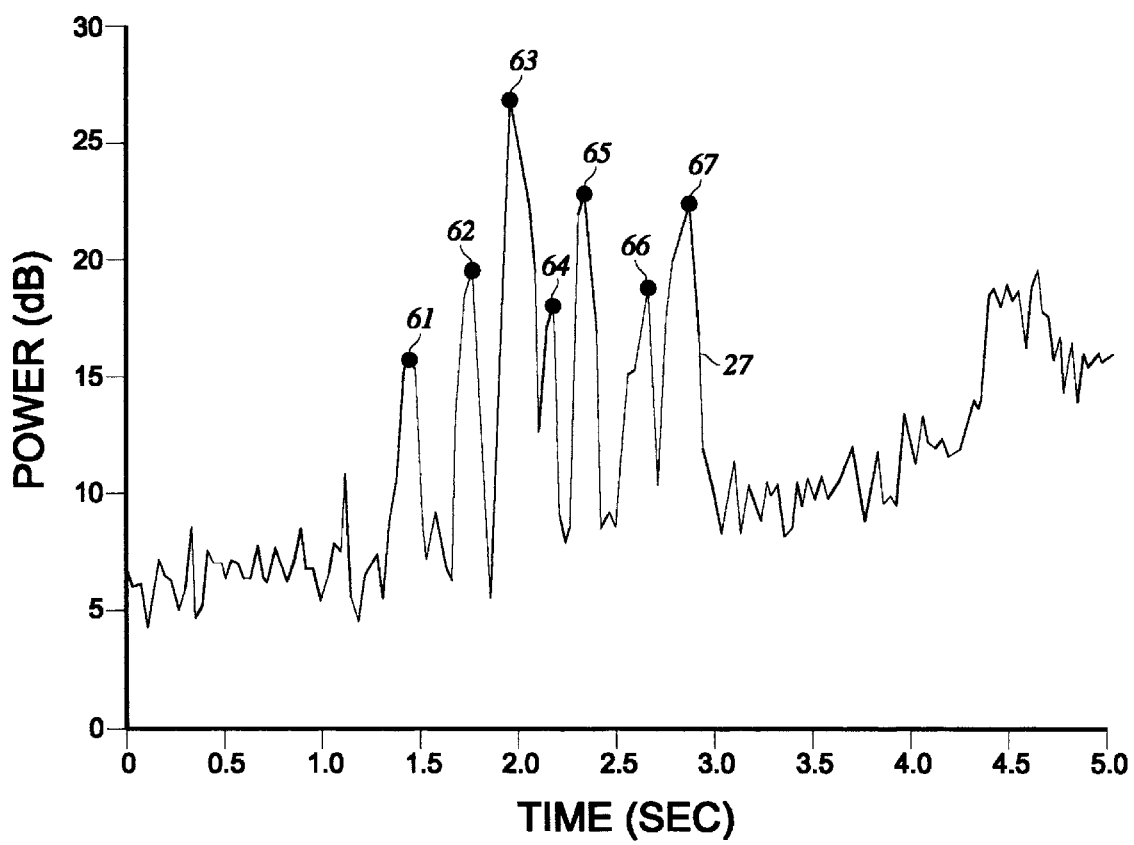
FIG. 6 is a time-power diagram illustrating the effect of the passage of vehicles through a predetermined location.

The analyzer 26 continually incorporates new power measurements 25 into the power history 27. The analyzer 26 then identifies features in the power history 27 as described below, to determine when a vehicle has passed by the microphone array (result 28a in FIG. 2b) to determine the speed of a passing vehicle (result 28b), or to determine the presence of a stationary vehicle (result 28c). FIG. 6 shows a typical power history 27 for a single predetermined location 30e as multiple vehicles pass by the microphone array 10.

As seen in FIG. 6, peaks 61, 62, 63, 64, 65, 66, 67 of a particular shape and height in the power history 27 represent the passage of a vehicle in lane 2 through the location 30e. By determining the time difference between the passage of a vehicle through two locations such as 30b and 30e, for example, the vehicle's speed and direction can be readily computed. Additionally, the shape or width of the peaks 61–67 provides an estimate of speed, as it indicates the amount of time the vehicle took to transit the area of a single predetermined location such as 30e. By comparing the power level in a pre-determined location 30e with the power level measured when a vehicle is not present, a determination of vehicle presence (28c) can be made. Other features gleaned from the microphone outputs can be used to determine the kind or length of vehicle or other information.

Figure 7:
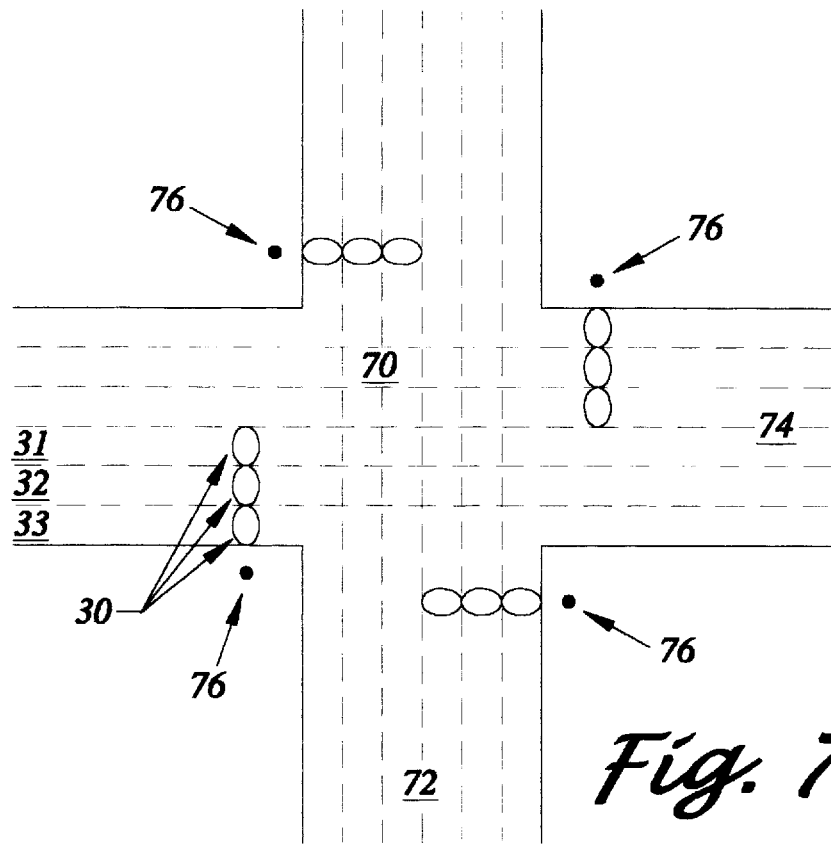
FIG. 7 is a plan view of an intersection using an alternative embodiment of the invention.

FIG. 7 illustrates a simplified practical embodiment of the invention. The task of this embodiment is merely to count, and determine the speed of, vehicles in the left-turn lane 31, through lane 32, and right-turn lane 33, respectively, of an intersection 70 of multilane streets 72, 74. For this purpose, an array 10 comprising four microphones 10a through 10d is mounted on a street light pole 76 or other similar platform at each of the four approaches to the intersection 70.

The microphone array 10 monitors locations in each lane 30 as shown in FIG. 3. The audio signals received by the microphones 10a through 10d are digitized, fltered, beamformed, accumulated into power histories, and analyzed to produce the traffic information outputs of vehicle count 28a, vehicle speed 28b, and vehicle presence 28c. This traffic information is translated into a counting pulse format that is compatible with the output of conventional inductive loop counters for transmittal to the traffic management center. Thus, the microphone arrays are able to not only duplicate the counting and vehicle-presence-by-lane function of inductive loops but also to provide an indication of vehicle speed in each lane.

Figure 8:
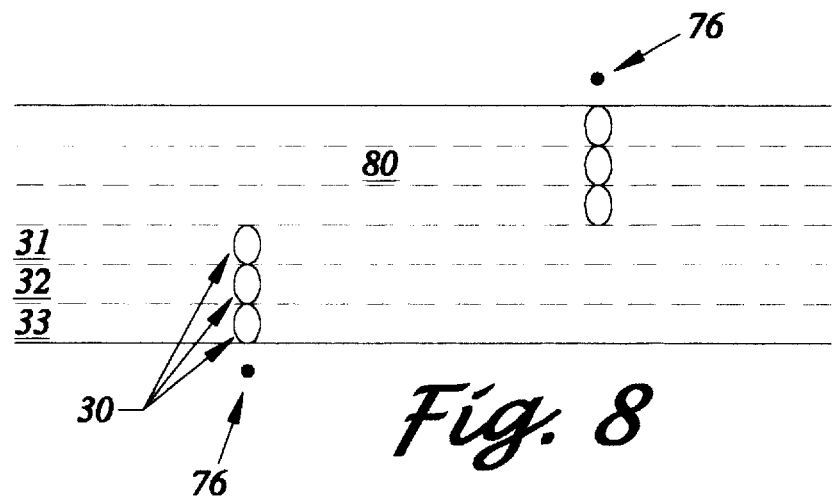
FIG. 8 is a plan view of a non-intersecting roadway using the embodiment of FIG. 7.

FIG. 8 illustrates another practical embodiment of the invention. The same hardware configuration as used for the traffic intersection 70 is used to monitor the flow of traffic along a street, road, or highway 80. In this embodiment, the microphone array 10 is mounted on a street light pole or similar platform 76 at the side of the road, far from any intersection in order to monitor traffic count and speed for traffic management. The operation of the invention is as described above. Possible applications for this embodiment are highway/freeway traffic monitoring, freeway on- or off-ramp monitoring, and traffic monitoring on urban streets between intersections. Cost savings for this invention accrue relative to the cost for a conventional inductive traffic loop sensor, since installation of the microphone array 10 does not require sawing grooves into the street surface to accommodate for the inductive loop wires. The microphone array 10 and its system electronics package can be installed on pre-existing street light or power poles. In addition, when used in the self-contained configuration of FIG. 1 for temporary traffic studies, the system can readily be moved from one location to another.

It is understood that the exemplary passive acoustic traffic monitoring system described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A passive traffic monitoring system, comprising:
   a) a microphone array including a plurality of microphones spaced from one another, said array being positioned to have a field of view covering a traffic area to be monitored;
   b) each of said microphones producing a first signal representative of sound impinging on said microphone;

c) a filter arranged to produce second signals containing only those components of said first signals which lie within at least one predetermined frequency range associated with vehicles in said traffic area;

d) a beamformer arranged to combine said second signals so as to produce third signals representative of sound power reaching said microphones from selected predetermined locations within said traffic area;

e) a power history generator arranged to store said third signals and to generate therefrom a power history with respect to time for each of said locations; and f) an analyzer arranged to analyze said power histories and to produce therefrom fourth signals representative of vehicle movement parameters at said locations.

2. The system of claim 1, in which said first signals are digitized, and said filter, beamformer, power history generator and analyzer are software routines operating on said digitized first signals.

3. The system of claim 1, in which said parameters include vehicle count, vehicle speed, and vehicle presence.

4. A passive system for monitoring vehicular traffic in separate lanes of a roadway, comprising:

a) a microphone array including a plurality of microphones mounted to receive sound from said lanes and translate it into first electric signals;

b) a beamformer arranged to translate said first electric signals into second signals each representative of sound power emanating from a predetermined location in said lanes; and c) an analyzer arranged to analyze variations of said second signals as a function of time to produce therefrom information representative of vehicle movement parameters in each of said lanes;

d) said second signals being restricted to at least one frequency range in which the power differential between vehicle sounds and background noise is maximized.

5. A passive system for monitoring multiple lanes of traffic on a roadway, comprising:

a) a microphone array including a plurality of microphones spaced from one another, said array being positioned above a roadway to have a field of view covering a traffic area of said roadway to be monitored;

b) an electronics unit connected to said microphone array, said electronics unit including:

i) a digitizer arranged to convert analog signals generated by said microphones into digital signals;

ii) a digital signal processor connected to said digitizer and arranged to compute output signals from said digital signals, said output signals being representative of vehicle movement parameters in individual lanes of said traffic area; and iii) an output device arranged to generate formatted information from said output signals.

6. The system of claim 5, in which said output device is a computer monitor.

7. The system of claim 5, in which said output device is a recorder.

8. The system of claim 5, in which said output device is an interface arranged to so format said information from said output signals as to be compatible with apparatus equipped to utilize the output of inductive traffic loops.

9. A passive system for monitoring multiple lanes of traffic on a roadway, comprising:

a) a microphone array including a plurality of microphones spaced from one another, said array being positioned to have a field of view covering a traffic area of said roadway to be monitored;

b) an electronics unit connected to said microphone array, said electronics unit including:

i) a digitizer arranged to convert analog signals generated by said microphones into digital signals;

ii) a digital signal processor connected to said digitizer and arranged to compute output signals from said digital signals, said output signals being representative of vehicle movement parameters in individual lanes of said traffic area; and iii ) an output device arranged to generate formatted information from said output signals;

c) said digital signal processor including:

i) an input arranged to receive from said digitizer first signals representative of sounds impinging on said microphones;

ii) a filter arranged to produce second signals containing only those components of said first signals which lie within at least one predetermined frequency range associated with traffic elements in said traffic area;

iii) a beamformer arranged to produce a third signal containing only those components of said second signals which originate within a predetermined location relative to said microphone array;

iv) a power summer arranged to produce for each said location a fourth signal containing the total power of said third signals; and v) a power history analyzer arranged to produce from said fourth signals an output containing traffic flow information including for each said lane at least 1) a count of vehicles that have traversed said field of view of said array;

2) a speed of said vehicles; or 3) a count of non-moving vehicles in the microphone array's field of view.

10. A method of monitoring traffic, comprising the steps of:

a) using a beam-steered microphone array to detect sounds from a plurality of discrete locations within the field of view of said array;

b) digitizing the output of said array;

c) filtering said digitized output to restrict it to frequencies associated with vehicle sounds;

d) producing from said filtered digitized output, for each said location, a sound power history as a function of time; and e) analyzing said power history to detect therefrom for that location data representing at least one of the number, speed, direction, and presence of vehicles in said location.

11. The method of claim 10, in which said analyzing step includes detecting power peaks with respect to time.

* * * * *